United States Patent [19]

Imes

[11] Patent Number: 5,625,975
[45] Date of Patent: May 6, 1997

[54] FISHING LURE INTERCHANGEABLE FLEXIBLE APPENDAGES

[76] Inventor: Ivan E. Imes, 10087 Jefferson Hwy. Apt. A, Baton Rouge, La. 70809

[21] Appl. No.: 494,683

[22] Filed: Jun. 26, 1995

[51] Int. Cl.⁶ .............................................. A01K 85/00
[52] U.S. Cl. .................... 43/42.09; 43/42.24; 43/44.4; 43/42.26; 43/42.28
[58] Field of Search ............... 43/42.09, 42.24, 43/42.26, 44.4, 42.13, 41, 42.28, 42.29, 42.3, 42.4, 42.41

[56] References Cited

U.S. PATENT DOCUMENTS

| | | | |
|---|---|---|---|
| D. 239,447 | 4/1976 | Radcliff | 43/42.26 |
| 2,413,344 | 12/1946 | Willman | 43/42.28 |
| 2,523,949 | 9/1950 | Gambill | 43/42.4 |
| 2,546,437 | 3/1951 | Gambill | 43/42.28 |
| 2,883,785 | 4/1959 | Croft | 43/42.28 |
| 3,082,562 | 3/1963 | Duncan | 43/42.28 |
| 3,147,564 | 9/1964 | Messler | 43/42.24 |
| 3,193,965 | 7/1965 | Jacobsen | 43/44.4 |
| 3,359,674 | 12/1967 | Strumor | 43/42.09 |
| 3,380,184 | 4/1968 | Fernandez | 43/42.24 |
| 3,959,912 | 6/1976 | Lee | 43/42.28 |
| 3,979,853 | 9/1976 | Storm | 43/42.09 |
| 4,006,551 | 2/1977 | Messacar | 43/42.28 |
| 4,033,063 | 7/1977 | Mize | 43/42.28 |
| 4,054,004 | 10/1977 | Schott | 43/42.09 |
| 4,189,860 | 2/1980 | Ebert | 43/44.4 |
| 4,233,771 | 11/1980 | Robinson | 43/44.4 |
| 4,312,148 | 1/1982 | Hardwicke, III | 43/42.24 |
| 4,468,881 | 9/1984 | Gordon, III | 43/42.25 |
| 4,596,086 | 6/1986 | Garland | 43/42.4 |
| 4,763,436 | 8/1988 | Lindmeyer | 43/42.4 |
| 4,914,849 | 4/1990 | Hook | 43/42.08 |
| 4,993,183 | 2/1991 | Carver | 43/42.24 |
| 5,428,918 | 7/1995 | Garrison | 43/42.24 |

OTHER PUBLICATIONS

Tackle Craft Catalog 1995–1996 p. 38, see "Imitation Pork Rind Tails".

*Primary Examiner*—Kurt Rowan
*Attorney, Agent, or Firm*—John F. Sieberth

[57] ABSTRACT

A combination of a fishing lure, such as a plastic worm, and an interchangeable, flexible appendage is disclosed in which the appendage is made of suitable synthetic resin or other suitable material and into which the lure is inserted whereby the performance of the lure is enhanced. Various appendage sizes, shapes, colors and color patterns are utilized. Various hook arrangements are also utilized.

5 Claims, 2 Drawing Sheets

5,625,975

FISHING LURE INTERCHANGEABLE FLEXIBLE APPENDAGES

BACKGROUND—FIELD OF INVENTION

This invention relates to enhancing fishing lures such as plastic worms, by providing for use therewith a flexible slip-on appendage which can be of varying sizes, shapes and colors.

BACKGROUND—DESCRIPTION OF PRIOR ART

Flexible fishing lures include many forms such as plastic worms and rigid and flexible combinations such as jigs. Refinements have been made by adding a variety of colors, textures, shapes and flavors to the basic lure. More exotic forms are molded with integral feet and other appendages or rubber hula skirts. Some have a weedless configuration with molded collars to sink the hook deeper into the soft plastic of the lure. Other designs feature improved hooking by using rotating or eccentrically located hooks. In older embodiments, prior art involved enhancing lures by adding pork rinds or a piece of bait such as shrimp onto the hook.

So far as is known, the prior art does not include an appendage or an appendage-lure combination of the types described hereinafter, let alone devices that function in the manner and possess the advantageous features of the subject matter of this invention.

OBJECTS AND ADVANTAGES

Accordingly, several objects and advantages of the present invention are:

a) To provide freely interchangeable and replaceable appendages.

b) To provide flexibility in locating the appendage toward the head or tail.

c) To provide a deeper hook sink in the single hook embodiment.

d) To provide outboard locations for the hook barbs in the double hook embodiment.

e) To provide a wide variety of color, action and shape combinations.

f) To shape the front edges to provide lifting or sinking action when moved through the water.

g) To provide a dual hook configuration with higher hooking efficiency.

h) To provide a wide range of attachable, multiple tails of varying lengths and complexity.

Other objects and advantages are ease of manufacture, installation and transport. These and further objects and advantages of the invention are shown and disclosed in the ensuing description and drawings.

SUMMARY OF THE INVENTION

This invention provides, as one embodiment, a fishing lure appendage member having wall defining a lure-insertion location therein, such as a flexibly expandable slit, slot or other suitable aperture extending through the appendage member. The lure-insertion location is sized and adapted on flexible expansion to engage and clasp the body of the lure once the appendage has been slipped onto the lure to the desired position, (or considering the matter from the point of view of the lure, once the body of the lure has been inserted through the appendage to the desired position). The appendage is preferably in the form of an elongate body and is composed at least in part of flexible material (e.g., flexible plastic, rubber or resin) in the area proximate to the lure-insertion location. Use of flexible material for the entire appendage is preferred as this serves two functions: it stretches to receive and grasp the lure and it assumes a swept back wriggling action when pulled through water. The lure-insertion location is preferably substantially intermediate the ends of the appendage. These extensions in turn are preferably in swept-back configuration. Most preferably the terminal end portions of the appendage have split ends or tendrils.

In a further embodiment, this invention provides a combination which comprises a fishing lure and an appendage member as described above. The lure is typically an elongate body in form and configuration simulating a worm, fish, minnow, grasshopper or other similar bait. As noted above, the appendage is likewise preferably in the form of an elongate body, and preferably has the lure-insertion location substantially intermediate the ends of the appendage so that when the lure and the appendage have been placed in the desired flexibly-engaged position relative to each other, the appendage is, in effects, divided into two transverse extensions of substantially equal length.

Single or multiple hook assemblies can be used with the devices of this invention. Typically, the hook is embedded in or otherwise attached to the lure with the barb or barbs of the hook extending into the appendage.

DRAWING FIGURES

In the drawings, closely related figures have the same number but different alphabetic suffixes.

REFERENCE NUMERALS IN DRAWINGS

| | |
|---|---|
| 9 Split Ends or Tendrils | 16 Appendage Front Bevel for Sinking Action |
| 10 The Appendage | 18 Double Hook |
| 11 Double Hook Barb | 20 Single Hook |
| 12 Slot Cut through Appendage | 21 Single Hook Barb |
| 13 Hole through Appendage | |
| 14 Lure (Shown as worm) | |
| 15 Appendage Front Bevel for Lifting Action | |

DESCRIPTION—FIGS. 1 TO 4

Figure 1A:
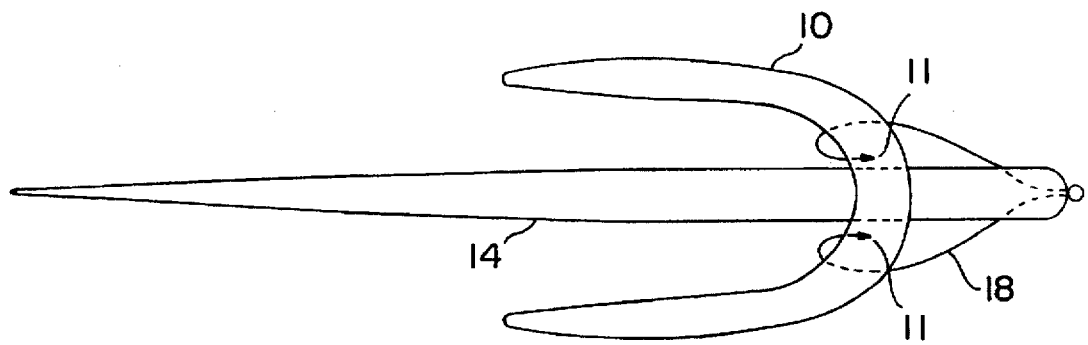
FIGS. 1A and 1B show the double hook embodiment in plan and elevation.
Figure 2A:
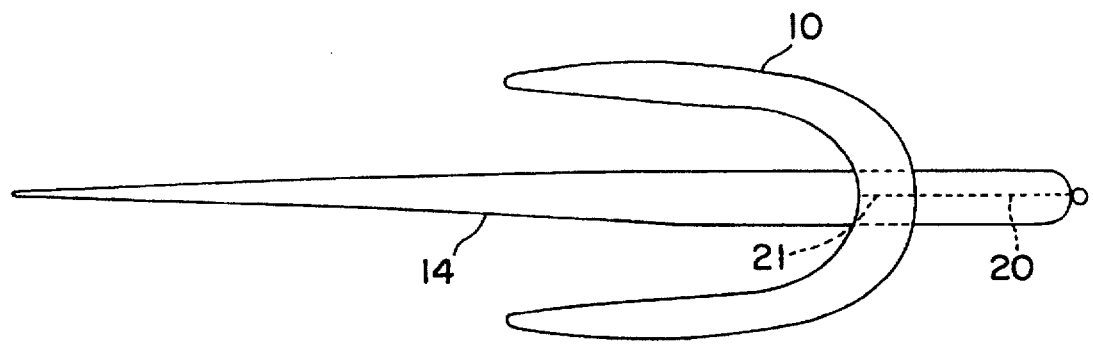
FIGS. 2A and 2B show the single hook embodiment in plan and elevation.

Two embodiments of the appendage are shown in FIGS. 1A and 2A. FIG. 1A is a plan view of the double hook arrangement of the appendage 10. The appendage slips over the lure 14. The hook 18 is then embedded into the lure head and the barbs 11 are buried in the appendage. FIG. 2A is a plan view of the single hook arrangement. The appendage 10 is slipped onto the lure 14 and a single shank hook 20 is threaded onto the lure with the barb 21 extended into the appendage.

Figure 1B:
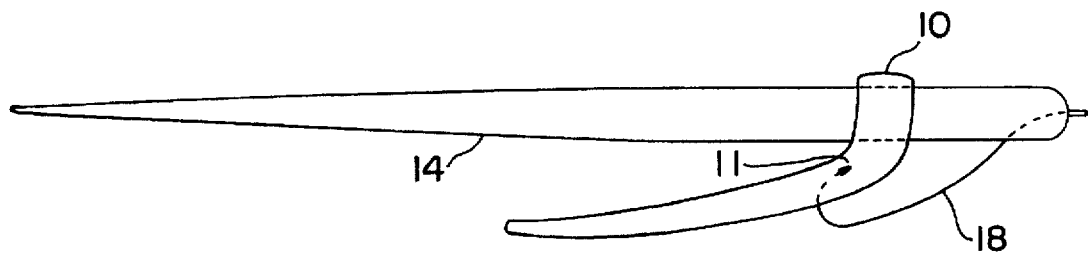
Figure 2B:
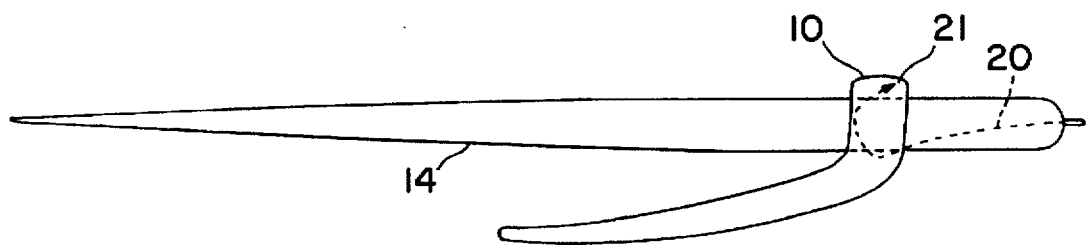

FIG. 1B is an elevation view of the: double hook arrangement. FIG. 2B is an elevation view of the single hook arrangement.

Figure 3A:
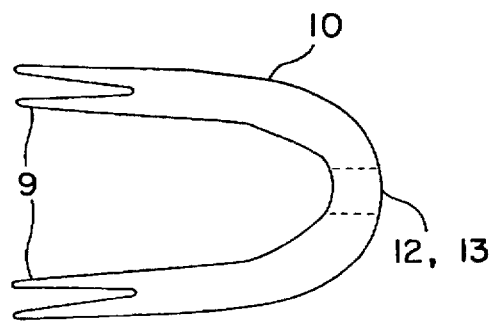
FIGS. 3A shows the appendage with a split end in plan view.
Figure 3B:
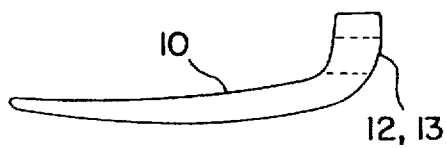
FIGS. 3B to 3D show the appendage in elevation view with front level for neutral (B), sinking (C) and rising (D) action in the expanded position as if the lure were inserted.
Figure 3C:
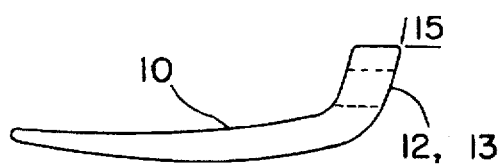
Figure 3D:
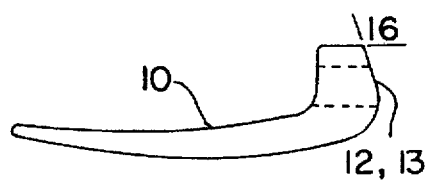

FIG. 3A is a plan view of the appendage 10. The important features are the slot for lure insertion 12, 13 and the appendage ends or tendrils or filaments 9. The appendage will accommodate any configuration of item 9 that can be cast or threaded together. FIG. 3B is an elevation view of the appendage 10 with the slot 12, 13 expanded. FIG. 3B is a neutral orientation in that it neither causes the lure to rise or fall on retrieval. FIG. 3C is the elevation view with the front 15 of the appendage formed to rise on retrieval. FIG. 3D is the elevation view with the front 16 of the appendage formed to fall on retrieval.

Figure 4A:
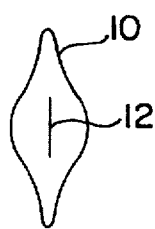
FIGS. 4A and 4B show the appendage in plan view with a cut slot for inserting the lure before (A) and after (B) insertion.
Figure 4B:
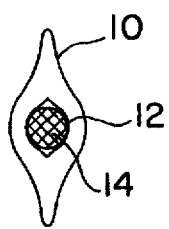

FIG. 4A is the end view of the appendage 10 showing the fore where the slot 12 for the lure is cut through the appendage. FIG. 4B is the same view with the lure 14 inserted in the appendage 10 slot 12.

Figure 4C:
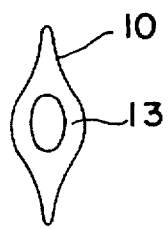
FIGS. 4C and 4D show the appendage in plan view with a precast hole for lure insertion before (C) and after (D) insertion.
Figure 4D:
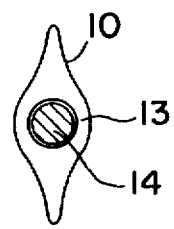

FIG. 4C is the end view of the appendage 10 showing the form where the slot 13 for the lure is preformed. FIG. 4D is the same view with the lure 14 inserted in the appendage 10 slot From the description above, it is obvious that there are several advantages to the use of an appendage to fishing lures, especially those shaped like artificial worms. The appendage can be large or small relative to the lure. The appendage-lure color combinations are interchangeable. The appendage can be slid forward or rearward on the lure. The lure can be made to rise or dive. The appendage can have any length. Shape and configuration of the appendages can be varied such as by having multiple or filamentous ends. The appendage focuses the fishes attention and strike tendency to the head where the hooks are buried. The appendage can be used with a single or double hook to enhance strike efficiency. The single hook configuration places the barb higher and therefore nearer a larger part of the fish to improve strike efficiency.

OPERATION—FIGS. 1 AND 2

The appendage is used by fishermen who fish with flexible or plastic lures. It is an add-on device to enhance lure performance and is carried in the tackle container with other lures. The fisherman slips the appendage over the lure head or tail and slides it up or down the lure to his selected location. The hook with one or two barbs is embedded into the appendage fixing it to the lure.

The appendage color is chosen to match or accentuate the lure color. For bottom fishing, a darker color may be used to simulate feet, or a brighter color may be chosen to simulate a mating display. A more transparent color may be used to simulate fins.

The appendage increases the lure weight in casting; and in different density versions, it increases or decreases buoyancy in the water. It also increases drag in the water giving more swimming motion for a slower retrieve.

since the appendage is easily replaced, lure damage is quickly repaired by removing the damaged appendage and installing a new one. This is true for both the soft body lure such as a worm or a hard body lure such as an elongated minnow Rapala.

SUMMARY, RAMIFICATIONS, AND SCOPE

Accordingly, the reader will see that the attachable appendage of this invention can be used to supplement the fisherman's bag of tricks in many ways. It will allow him to customize his lures while on the water and catch more fish.

The concept of an attachable appendage is versatile. In addition to the forms already described, the appendage can be applied using a three barb hook with all three barbs inserted vertically. Such a hook does not exist but could easily be manufactured. Also, the appendage can be used with a trailer hook wherein a single barb hook or a double barb hook could be attached to a second appendage further rearward on the bait. Trailer hook arrangements using single barb hooks are in common use.

Although the description above contains many specifications, these should not be construed as limiting the scope of the invention, but as merely providing illustrations of some of the presently preferred embodiments of this invention. For example, the appendage may have a variety of ways of being attached to the lure in addition to or combined with the slit or hole, such as slipping the appendage through the lure or separately fastening the two elements together. Also, the appendage can have any shape and color that proves effective as a fish attractor.

Thus, the scope of the invention should be determined by the appended claims and their legal equivalents rather than by the examples given.

I claim:

1. A combination which comprises (a) a fishing lure, and (b) an appendage adapted for detachable attachment to said lure, said appendage comprising an elongated body having (i) terminal end portions, (ii) an intermediate zone disposed between said end portions, (iii) walls in said intermediate zone defining a flexibly expandable aperture extending transversely through said body and defining a lure-insertion location therein adapted to engage and clasp the lure when the lure is inserted through said aperture whereby at least the intermediate zone of the appendage is transverse to the lure, and wherein:

(1) said aperture is substantially half-way between the end portions of the body of said appendage;

(2) substantially all of the body of said appendage is composed of flexible material;

(3) said lure is disposed through said aperture and is flexibly engaged and clasped by said walls defining said aperture;

(4) the body of said appendage is configured to include a pair of swept-back lateral extensions disposed respectively between said intermediate zone and the respective end portions of said body;

(5) said end portions have multiple or filamentous ends; and (6) said combination further comprises at least one fishhook embedded in or otherwise attached to said lure with the barb or barbs of the fishhook extending into said appendage.

2. A combination of claim 1 wherein said appendage further includes at least one substance providing a fish-attractive flavor or a fish-attractive odor, or a combination thereof.

3. A combination of claim 1 wherein said aperture is in the form of a normally-closed slit.

4. A combination of claim 1 wherein said aperture is in the form of a normally-open but further-expandable aperture.

5. A combination of claim 1 wherein said lure is in the form of an elongate body simulating a bait object.

* * * * *

UNITED STATES PATENT AND TRADEMARK OFFICE
CERTIFICATE OF CORRECTION

PATENT NO.   : 5,625,975
DATED        : May 6, 1997
INVENTOR(S)  : Ivan E. Imes

It is certified that error appears in the above-indentified patent and that said Letters Patent is hereby corrected as shown below:

Column 3, line 63, reads "since" and should read --Since--.

Claim 1, Column 4, line 39, the first line of subsection (1), reads "the,end" and should read --the end--.

Signed and Sealed this

Sixteenth Day of September, 1997

Attest:

BRUCE LEHMAN

Attesting Officer

Commissioner of Patents and Trademarks